Jan. 12, 1943.   O. E. FRUNK   2,307,883
METHOD AND MEANS FOR PRODUCING SECONDARY RADIATION
DIAPHRAGMS FOR ROENTGEN APPARATUS
Filed Nov. 28, 1940   2 Sheets-Sheet 1
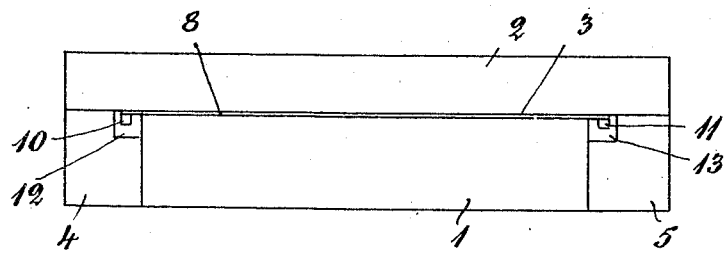
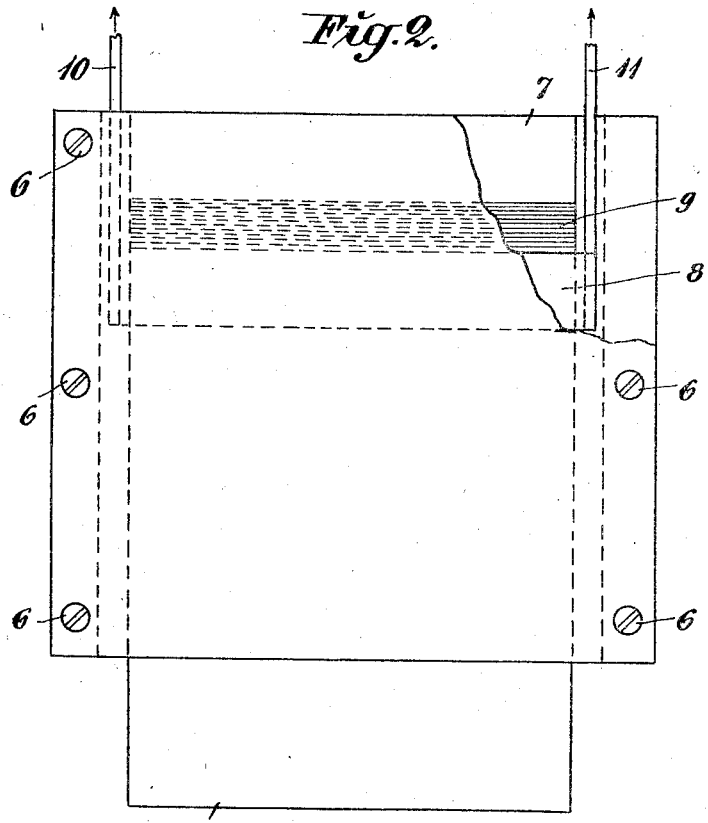
Inventor,
O. E. Frunk
By: Glascock, Downing & Seebold
Attys.

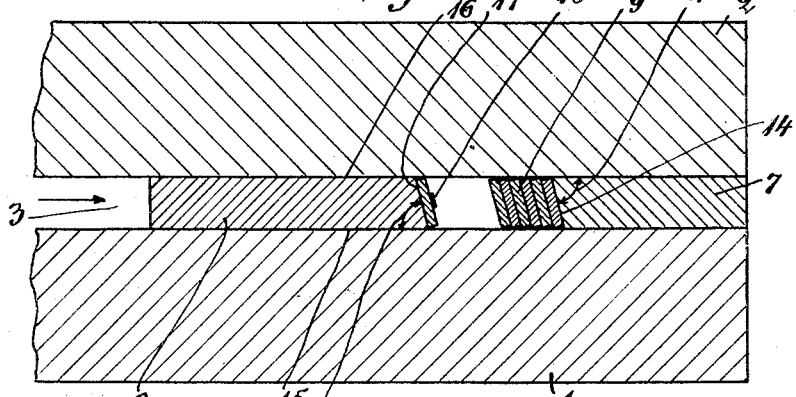
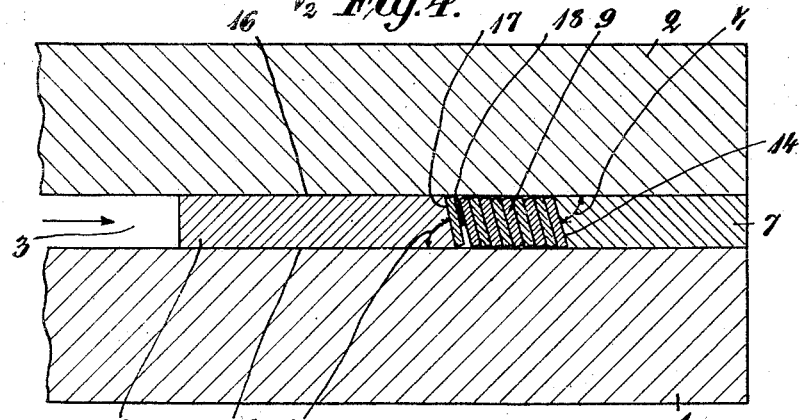
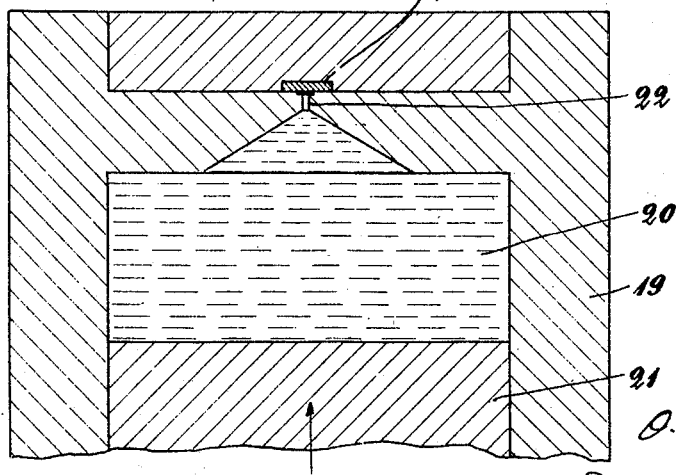

Patented Jan. 12, 1943

2,307,883

UNITED STATES PATENT OFFICE 2,307,883

METHOD AND MEANS FOR PRODUCING SECONDARY RADIATION DIAPHRAGMS FOR ROENTGEN APPARATUS

Otto Emanuel Frunk, Stockholm, Sweden, assignor to Aktiebolaget Linham, Stockholm, Sweden, a company of Sweden Application November 28, 1940, Serial No. 367,650
In Sweden November 7, 1939

2 Claims. (Cl. 250—63)

The present invention refers to a method of producing such secondary radiation diaphragms as used in Roentgen-photography which form a grid-like plate of edgewise erected laminated absorption bodies from lead, said bodies being separated by thin layers of a material pervious to Roentgen-rays.

Diaphragms of this type are generally produced in such manner that the laminae are first coated with an adhesive which is allowed or caused to dry or set, after which they are brought together with their broad sides facing each other, whereupon the laminae are united by being first heated, so that the adhesive is rendered sticky, and by being then cooled. Great difficulties are encountered in such a method of producing diaphragms of a homogeneous structure, inasmuch as internal tensions may readily set in within the plate, which are responsible for displacements and deformations of the laminae which, in turn, may cause misrepresentations on the photographic plate.

An object of the present invention is to obviate such advantages and provide a method wherein the laminae on having been coated with adhesive are introduced edgewise between two plates and, while the adhesive is still soft and sticky, are pressed against each other by means of a press tool in the form of a ruler or the like, and kept under pressure until the adhesive has set, entirely or in part.

The invention is of particular importance in the manufacture of secondary radiation diaphragms with focalizing laminae, that is to say diaphragms in which the laminae are directed toward the focus of the Roentgen tube so as to form angles to each other. In such diaphragms it is understood to be of particular importance that the adhesive does not form a coating of uniform thickness on the laminae but is given the opportunity to fill the wedge-like spaces between the laminae as completely as possible, so that the finished plate will form a solid body throughout. In a method according to the invention, this is attained by the fact that the adhesive is soft and sticky when the laminae are brought to bear on each other, so that the adhesive may be displaced freely under the influence of the lateral pressure on the laminae, in order thus to fill out the spaces between the laminae. A further improvement in this respect may be obtained according to the invention by the adhesive being applied only along the middle portion of the laminae in the form of a string which is narrower than the lamina. In the pressing of the laminae against each other this adhesive string is compressed between the adjacent laminae so as to flow out over the surfaces of the laminae to fill the spaces therebetween while facilitating at the same time the directing of the laminae into the proper position relatively to each other. This method of applying the adhesive in the form of a narrow string also involves the advantage that the adhesive when applied in a suitable quantity will spread over the sides of the laminae without being pressed out at the edge portions.

The invention will be described more closely with reference to the accompanying drawings, wherein Figures 1 and 2 show endwise view and a plan view respectively of an apparatus for making a secondary radiation diaphragm in accordance with the invention. Figures 3 and 4 are sections to a larger scale through the apparatus in different stages of the manufacture. Figure 5 is a section through an apparatus for applying adhesive onto the laminae.

According to the form of embodiment shown in Figures 1 and 2, the apparatus consists of two plates 1 and 2, preferably of iron, the same being arranged horizontally above each other in such manner that a free space 3 is formed between them of a height equal to the thickness of the secondary radiation diaphragm to be produced. The upper plate 2 rests on two rails 4, 5 arranged along the sides of the lower plate 1. The upper plate 2 is rigidly connected to the rails 4, 5 by means of screws 6. Arranged at the rear end of the lower plate 1 is a ruler 7 which fills the space between the plates 1 and 2. The apparatus is also provided with a movable ruler 8 to which may be imparted a parallel movement in the space between the plates 1 and 2 so as to introduce the laminae 9 into the space 3. The ruler may be moved, for instance, with the aid of two rods 10, 11 secured to the end of the ruler, said rods being movable in their longitudinal direction in two corresponding recesses 12, 13 in the rails 4, 5.

Each lamina 9 is composed in known manner of two layers of material, such as a layer of lead absorbing the Roentgen rays, and a second layer pervious to the Roentgen rays, which latter layer may consist of paper, for example. The laminae are generally made in such manner that a thin lead foil is provided with a covering of paper, whereupon laminae of the desired width are punched out of the composite foil. When such laminae are brought together with their broad sides against each other, the paper layers will form the translucent portions of the diaphragm.

Figures 3 and 4 illustrate the manufacture of diaphragms with focalizing laminae, that is to say, of laminae directed towards the focus of the Roentgen tube. In such a diaphragm, the central lamina will take a position at right angles to the lateral surfaces of the diaphragm, while the laminae on both sides of the central lamina are inclined to the latter at an outwardly increasing angle. The inner edge surface of the rigid ruler 7 will then form an angle $v_1$ to the inner surfaces 15, 16 of the plates 1, 2, which angle corresponds to the desired angular position of the outermost lamina of the diaphragm plate. To bring the laminae into different angular positions, a number of loose rulers 8 are made use of in the manner to be described hereinbelow, the edge surface 17 of which forms different angles $v_2$, $v_3$ and so forth to the inner surfaces of the plates 1, 2. Figures 3 and 4 show two rulers having different edge angles $v_2$, $v_3$ the angle $v_2$ in Figure 3 being equal to the angle $v_1$. To obviate the use of too great a number of loose rulers 8 with different edge angles, the diaphragm plate is made in a manner such that the laminae are arranged in different angular positions in groups only, whereas the laminae of each group are mutually parallel, sufficient accuracy with respect to the angular position of the laminae being obtained for all practical purposes, however.

The manufacture of a diaphragm plate is proceeded with in such manner that the laminae coated with adhesive at one side thereof are inserted edgewise, one at a time, into the space between the plates 1, 2 to be compressed between the rulers 7 and 8. While the ruler 8 is in retracted position on the free end of the lower plate 1, a lamina is brought against the edge surface 17 of the ruler, whereupon the latter is inserted into the space between the plates. When the lamina is brought by means of the ruler 8 to bear on the edge 14 of the rigid ruler, it is retained in this position through the friction against the inner surfaces of the plates 1, 2. Prior to being introduced into the apparatus the following laminae are provided on one side thereof with a coating of adhesive 18, whereupon the lamina is brought against the edge of the ruler 8 and is inserted by means of the latter in between the plates 1 and 2 so as to be brought to bear on the previously inserted lamina. Preferably, the adhesive consists of a substance which is sticky at ordinary temperatures, such as a cold-glue or a solution of an adhesive in a volatile liquid. At any rate, it is of importance that the adhesive is not allowed to dry or to set until the lamina has been moved into its place. When the lamina is displaced by means of the ruler 8 against the preceding lamina, the adhesive will consequently be pressed out over the opposite sides of the two laminae so as to cover the side surfaces in the form of a thin coating. The ruler 8 is then kept bearing on the lamina under a suitable, preferably resilient pressure for a duration such that the laminae will be united with each other by the setting of the adhesive. The adhesive need not set completely, however, before the ruler 8 is moved back and another lamina is introduced and applied in the same manner. If the distance between the plates 1, 2 is adapted to the width of the laminae so that the latter are effectively retained in their places by the friction between the edge portions of the laminae and the inner sides of the plates, the ruler 8 may be moved back into the initial position almost immediately upon the compression, whereby the time of manufacture is reduced to a considerable extent. By the fact that the lamina is brought into its place immediately after the adhesive has been applied and before it has had time to set, the otherwise required heating of the laminae is avoided. The method in its entirety may thus take place at ordinary room temperature, whereby the manufacture is very much simplified and rendered considerably cheaper, while the time of manufacture is also reduced.

As shown in the drawing, the adhesive is not applied over the whole surface of the lamina. It has proved advantageous to apply the adhesive only along the middle portion of the lamina in the form of a string. Figure 5 shows a suitable contrivance for applying the adhesive in this way. This contrivance consists of a container 19 which is filled with adhesive 20 and is provided with a plunger 21, by means of which the adhesive may be pressed out through a narrow cylindrical opening 22 in the one end wall of the container. The hole 22 opens into a recess 23 in the end wall, said recess serving as a guide for the lamina and extending in a vertical direction all over said end wall and having the same cross sectional shape as that of the laminae. When the adhesive is to be applied, the lamina is moved through said recess 23, a certain pressure being exerted on the plunger 21 at the same time so that the liquid adhesive is pressed out to form a longitudinally extending string on the opposite side of the lamina. The quantity of adhesive applied may be adapted by controlling the pressure on the plunger 21 and the speed at which the lamina is moved through the recess 23.

A certain number of laminae having been inserted into the space between the plates 2 and united with each other, the movable ruler is replaced by another ruler having a somewhat greater edge angle $v_3$, whereupon a further number of laminae are inserted in the manner above described. This new group of laminae will then take an inclined position corresponding to the angle $v_3$. However, a certain displacement of the laminae in the preceding group will take place at the same time for the reason that the new laminae will act with a greater pressure along the upper edge of the preceding laminae, and then at least the outermost laminae of the preceding group will change their angular position a little into coincidence with the angle $v_3$. Such adjustment of the laminae is facilitated by the fact that the adhesive is applied only at the middle portion of the laminae, whereby the coating of the adhesive will be somewhat more compact at the centre than at the edges. The application of the adhesive in this manner also involves the advantage that the adhesive will flow out more readily in the transition from one angular position to another so as to fill the wedge-shaped space between the laminae. Figure 4 illustrates the stage in the manufacture in which the first lamina in the next group of laminae is inserted by a ruler with the next greater edge angle $v_3$. By applying the adhesive only at the middle portion of the lamina and by suitably adapting the quantity of adhesive applied the adhesive spreads practically all over the side surfaces of the laminae without penetrating out at the upper and lower lower edges of the laminae. Thus sticking of the laminae to the plates 1, 2 will be prevented, whereby the removal of the finished diaphragm plate out of the apparatus would be rendered more difficult. Said method of applying the adhesive is also of importance to render possible the introduction of the laminae between the plates 1, 2. If the laminae be instead coated with adhesive all over the lateral surface thereof, the adhesive would deposit on the insides of the plates, and would upon setting prevent the insertion of further laminae. By the application of the adhesive only at the middle portion of the lamina the edge portions of the laminae may be kept free of adhesive during the manufacture of the diaphragm.

I claim:

1. The method of making a laminated diaphragm for X-ray photography which consists in, forming composite laminae of different permeable and impermeable materials for X-rays, applying an adhesive onto the broad sides of the individual laminae in the form of a string which is narrower than the lamina, assembling the laminae to form a diaphragm by placing the laminae successively with their broad sides against one another while the adhesive is still soft and sticky, and applying pressure to the individual laminae to unite the laminae at ordinary temperature.

2. The method of making a laminated diaphragm for X-ray photography which consists in, forming composite laminae of different permeable and impermeable materials for X-rays, applying an adhesive onto the broad sides of the individual laminae in the form of a string which is narrower than the lamina, assembling the laminae to form a diaphragm by placing the laminae successively with their broad sides against one another while the adhesive is still soft and sticky, applying pressure to the individual laminae to unite the laminae at ordinary temperature, and varying successively the angle between adjacent laminae according as the assembling operation proceeds to form a focalized diaphragm.

OTTO EMANUEL FRUNK.